United States Patent [19]

Sulzbacher et al.

[11] Patent Number: 4,740,240

[45] Date of Patent: Apr. 26, 1988

[54] SMELTING PROCESS FOR RECOVERING METALS FROM FINE-GRAINED NON-FERROUS METAL SULFIDE ORES OR CONCENTRATES

[75] Inventors: Horst Sulzbacher, Leoben; Werner Kepplinger, Linz; Erich Ottenschläger, Traun, all of Austria

[73] Assignee: Voest-Alpine Aktiengesellschaft, Muldenstrabe, Austria

[21] Appl. No.: 761,869

[22] Filed: Aug. 2, 1985

[30] Foreign Application Priority Data

Aug. 16, 1984 [AT] Austria ................................. 2639/84
Aug. 16, 1984 [AT] Austria ................................. 2640/84

[51] Int. Cl.$^4$ ............................................... C22B 5/08
[52] U.S. Cl. .......................................... 75/23; 75/26; 75/74; 75/80; 75/84
[58] Field of Search .................. 75/23, 26, 38, 40, 74, 75/80, 84

[56] References Cited

U.S. PATENT DOCUMENTS

| | | | |
|---|---|---|---|
| 2,740,710 | 4/1956 | Johannsen | 75/80 |
| 2,978,315 | 4/1961 | Schenck et al. | 75/26 |
| 3,948,639 | 4/1976 | Nermes et al. | 75/9 |
| 3,948,645 | 4/1976 | Elvander et al. | 75/26 |
| 4,087,274 | 5/1978 | Edenwall et al. | 75/1 R |
| 4,224,056 | 9/1980 | Tomizawa et al. | 75/26 |
| 4,396,421 | 8/1983 | Stift et al. | 75/26 |

FOREIGN PATENT DOCUMENTS 63924 11/1982 European Pat. Off. .
2536392 9/1976 Fed. Rep. of Germany .
2128053 10/1972 France .

Primary Examiner—Melvyn J. Andrews
Attorney, Agent, or Firm—Cushman, Darby & Cushman

[57] ABSTRACT

In the smelting process of recovering metal from non-ferrous metal oxide ores or concentrates and/or from fine-grained non-ferrous metal sulfide ores or concentrates, particularly from non-ferrous heavy metal sulfide ores or concentrates, any sulfide ores are initially oxidized. The ores or concentrates are then supplied to a fluidized bed of coal in a melting gasifier (1). A certain particle size is maintained. Sulfide ores are supplied to a melting burner (2), which directs a flame jet into the fluidized bed of coal (FIG. 1).

13 Claims, 3 Drawing Sheets

SMELTING PROCESS FOR RECOVERING METALS FROM FINE-GRAINED NON-FERROUS METAL SULFIDE ORES OR CONCENTRATES

BACKGROUND OF THE INVENTION

1. Field of the Invention

This invention relates to a smelting process of recovering metal from non-ferrous metal oxide ores or concentrates and/or from fine-grained non-ferrous metal sulfide ores or concentrates, particularly from non-ferrous heavy metal sulfide ores or concentrates, wherein sulfide ores are oxidized with a supply of air and/or oxygen, and to apparatus for carrying out that process.

2. Description of the Prior Art

Such non-ferrous metal oxide ores may become available in granular or lump form but are produced, as a rule, from sulfide ores by an oxidizing roasting process. The roasting results in a production of sulfur dioxide in large quantities, which must be separately processed, e.g., to produce sulfuric acid. The pyrometallurgical processing of oxide starting materials in the form of lumps has previously been effected, as a rule, in low shaft furnaces used to produce blister copper or black copper. The gas formed in a low shaft furnace under reducing conditions consists, as a rule, of nitrogen, carbon dioxide and various sulfur compounds, such as $SO_2$, $H_2S$, COS and $CS_2$. The CO content of such exhaust gases is relatively low in most cases so that the exhaust gas has only a low calorific value. Non-ferrous heavy metal oxide ores can be reduced much more easily, as a rule, than iron oxide ores.

U.S. Pat. No. 3,948,639 describes a process and apparatus for smelting sulfide ores or concentrates in such a manner that the gases leaving the smelting furnace and the sulfide ore or concentrate are jointly supplied to a pretreating zone, from which the cooled gases are supplied to the upper end of the reaction zone of the smelting furnace for a recovery of sulfur and of the pretreated sulfide ore or concentrate.

French Patent Specification No. 2,128,053 describes a process and apparatus for recovering metals, particularly nickel, from ores, in which the metal is segregated in a fluidized bed by a combustion with air and a low-hydrogen fuel, such as coke.

For a reduction of iron ores with the aid of inexpensive fuels it has already been proposed to feed prereduced iron ore in the form of sponge iron directly to a melting gasifier, in which a fluidized bed of relatively low-grade coal is maintained and is used to decompose residual oxides and to generate the heat required for smelting.

In copper metallurgy, a number of processes have been proposed in which sulfide concentrates are directly oxidized in a melting burner with a generation of energy at a high rate. That solids-firing burner served for a simultaneous roasting and smelting of the concentrates to form matte. In succeeding settling hearths, the matte was separated from the slag. A disadvantage of that process resides in that $SO_2$ becomes available as a gaseous combustion product and must be utilized, e.g., in a plant for producing sulfuric acid. Besides, metal is lost at a high rate in the slag because a large proportion of the metal is dissolved as $Cu_2O$ in the slag under the oxidizing conditions prevailing in the smelting vessel. Other processes of treating non-ferrous metal ores require oxide ores as starting materials and the low shaft furnace operating under reducing conditions is the smelting equipment most widely used for that purpose.

It has also been proposed to operate reducing process stages in succession to suspension melting processes although such arrangement involve complicated flow paths for the exhaust gases because the oxidizing exhaust gases from the cyclone and the reducing exhaust gases from succeeding melting chambers or furnaces must be conducted in separate lines.

SUMMARY OF THE INVENTION

It is an object of the invention to improve that known technology in such a manner that it can be used to special advantage also for the processing of non-ferrous metal ores, particularly non-ferrous heavy metal ores.

Another object of the invention is to produce elementary sulfur and high-grade molten metal from sulfide ores with a low consumption of energy and with minimum losses in the slag.

This object is accomplished in accordance with the invention essentially in that the ores or concentrates are supplied in particle form such as lump form and/or granular form to a fluidized bed of coal in a melting gasifier. A requirement of the process in accordance with the invention is that the ore, which is initially fine-grained or in the form of lumps, as a rule, must be properly agglomerated; this can be effected, e.g., by pelletizing, briquetting or sintering. When such starting materials are used, the process can easily be controlled in adaptation to the ore to be processed and to varying concentrations and compositions thereof. The particle size of the ores to be supplied or concentrates usually lies between 1 mm and 50 mm, preferably between 3 mm and 30 mm. In the processing of iron ores, a difference from the known process resides in that the oxide material can be directly supplied to the melting gasifier and that owing to the presence of the fluidized bed of coal the supply rates of air or oxygen and coal can be controlled in quick adaptation to the ore which is to be reduced. The melting gasifier used in the process in accordance with the invention may be preceded by a reducing shaft or a different reducing unit (rotary kiln) and said reducing unit may directly be supplied with part of the exhaust gases from the melting gasifier. A difference from the known equipment resides in that the gas formed in the melting gasifier is strongly reducing and has a high calorific value so that it is highly suitable for a preliminary reduction. Besides, the conditions of the furnace atmosphere in the melting gasifier can be controlled so that said gasifier can be used for a reduction of sulfur dioxide to elementary sulfur, which can then be recovered by a condensation from the exhaust gases.

The coal in the fluidized bed of coal has suitably a particle size between 1 mm and 50 mm, preferably between 1 mm and 25 mm.

In a desirable manner, oxide ores are either preheated to temperatures between 500° and 900° C. or are roasted, if required, at temperatures between 700° and 900° C. before they are supplied to the fluidized bed of coal. Roasting will be particularly required if the starting materials have a relatively high sulfide content. Fine-grained ore must be agglomerated as it is roasted.

As the lump ore passes through the fluidized bed, the hot gases produced in the fluidized bed and the coal particles react with the metal oxides, which reacts with the coal or carbon monoxide to form metal, carbon monoxide and/or carbon dioxide. At the high temperatures which can be generated in the fluidized bed, the equilibrium represented by the equation $CO_2 + C = 2CO$ can be shifted toward the production of carbon monoxide so that a reducing exhaust gas will be formed. In that practice the fluidized bed of carbon is desirably maintained at temperatures between 1200° and 1800° C., preferably between 1300° and 1700° C., so that a reliable smelting of most of the interesting non-ferrous heavy metals is ensured. That embodiment of the process is particularly suitable for the recovery of copper, lead, zinc, nickel, cobalt and tin ores and of the complex compounds thereof. In such processing, part of the elements which boil or are volatile at low temperatures can be removed in the gaseous phase.

The energy balance can be improved in that part of the reducing gas withdrawn from the melting gasifier is used for a preliminary reduction and preheating of the raw materials. In that case the temperature of the fluidized bed of coal can be particularly controlled by a controlled injection of hot air and/or oxygen in the tuyere plane of the melting gasifier.

The gaseous reaction products formed in the melting gasifier have, as a rule, a high calorific value and may be purified in a high-temperature cyclone.

If the oxide starting material has been produced in an oxidizing roasting process from sulfuric ores, the process in accordance with the invention will permit a supply of the gases from roasting together with the oxide ores to the melting gasifier, in which the $SO_2$-containing gases which have been produced are contacted with the reducing atmosphere and the carbon contained in the melting gasifier to form elementary sulfur. Similarly, the gases from roasting may be admixed to the exhaust gases produced by the reaction in the melting gasifier because the exhaust gases produced by the reaction are at such a high temperature that the desired reaction to elementary sulfur can still be effected.

The fluidized bed of coal in the melting gasifier is preferably supplied with coal in a particle size range from 1 to 20 mm. At the high temperature in the gasifier, the coal is suddenly dried and degasified and is thus coked. The volatilized products react with carbon to form carbon monoxide and hydrogen gas, and the latter mixes with the carbon monoxide gas leaving the fluidized bed and is withdrawn from the gasifier. A major part of the coked coal particles constitutes the fluidized bed. Very fine coke is entrained by the gas at a low rate. The combustion-supporting agent is injected into the fluidized bed through tuyeres provided in the lower portion of the melting gasifier. The temperature in the tuyere plane of the fluidized bed is higher, as a rule, than in the remainder of the fluidized bed and the incandescent fine-grained coke from the fluidized bed is burnt with the oxygen to form $CO_2$. The flame temperatures may be distinctly higher than 2000° C. In addition to the nitrogen from the hot blast, carbon monoxide gas flows through the fluidized bed. That carbon monoxide gas is produced by a reaction of $CO_2$, produced near the tuyeres, with C. The gas delivers part of its heat to the coke particles to heat the fluidized bed. The fluidized bed has a height of about 2 to 4 meters, as a rule, and constitutes a violently agitated layer of incandescent fine coke at temperatures between 1400° and 1700° C. Non-ferrous metal oxide ores are directly charged into the melting gasifier at its top and descent through the fluidized bed so that they are reduced and smelted. The liquid and pasty components are homogenized at the interface between the coke bed and the slag bath and a slag is formed there, which consists of ore, coal ash and any fluxes. The metal droplets thus formed absorb additional heat as they move through the slag. Oxide ores may be reduced by the hot coke and by the rising gas with formation of carbon monoxide and carbon dioxide. But such a reduction can be effected only if the ores can easily be reduced, as is the case with certain non-ferrous metal ores or non-ferrous heavy metal ores whereas such a reduction of iron ore would involve an excessively high energy requirement.

The gas emerging at the upper surface of the fluidized bed supplies the heat for the coking of the carbonaceous material to be supplied to the fluidized bed. The degasification results in a temperature rise of the coal and in an evaporation of the water, in a release of the volatile constituents, and in a reaction of the latter to form carbon monoxide and hydrogen. The high-grade fuel gas leaves the melting gasifier together with the gaseous reaction products. In dependence on the volatile content of the coal, the gas has usually a composition between 50 and 90% CO and 10 to 40% hydrogen. The $CO_2$ content varies with temperature and decreases as the gas temperature rises.

An advantage afforded in the processing of copper ores compared with the pyrommetallurgy of iron resides in that the smelting can be carried out at lower temperatures and requires less energy.

For a processing of sulfide ores or concentrates, a preceding melting burner is provided and the flame jet from the suspension burner is directed onto the fluidized bed of coal whereas the molten products are withdrawn below the coal bed. The liquid or pasty products produced in the melting burner fall into a fluidized bed of coal. The melting burner may be supplied with a fine-grained sulfide ore concentrate, slag-forming materials and recycled material and with preheated air, an oxygen-air mixture or pure oxygen. The temperatures of the combustion air are usually preselected in the range from 300° to 1000° C. so that the sulfide ore concentrates are oxidized at least in part. The reactions taking place, e.g., in the recovery of copper may be expressed by the following equations:

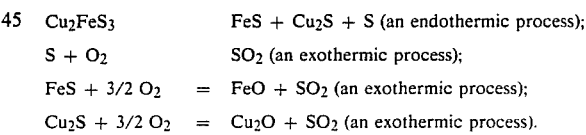

| $Cu_2FeS_3$ | | $FeS + Cu_2S + S$ (an endothermic process); |
|---|---|---|
| $S + O_2$ | | $SO_2$ (an exothermic process); |
| $FeS + 3/2\ O_2$ | $=$ | $FeO + SO_2$ (an exothermic process); |
| $Cu_2S + 3/2\ O_2$ | $=$ | $Cu_2O + SO_2$ (an exothermic process). |

The heat which is generated because the exothermic processes predominate is sufficient for a smelting of the fine-grained ore concentrates. The process is usually carried out at a temperature above 1100° C. After that reaction in the melting burner the reaction products which have been formed are thrown into the fluidized bed of coal. The jet impinges directly on the upper surface of the fluidized bed of coal. That direct coupling of the melting burner process to a reducing process carried out in the fluidized bed of coal affords important advantages also from the energy aspect. The molten products formed in the melting burner are mainly metal sulfides, oxides and slag products, which are introduced in the form of droplets into a bed of fine coal, which is fluidized by an injection of mixtures of oxygen and hot air or of hot mixtures of air and oxygen. In the fluidized bed of coal, the combustion of the oxygen and carbon results in the formation first of $CO_2$ and then of carbon monoxide, which forms bubbles rising through the bed of fine coal to promote the agitation of the bed. The height of the fluidized bed of carbon is maintained constant by a supply of coal at a controlled rate. The molten products and the SO₂-containing gases which are formed in the melting burner impinge directly on the upper surface of the fluidized bed. The molten material trickles through the fluidized bed and is collected at the bottom of the melting vessel to form a sump of molten material consisting of metal and/or matte and of slag. In accordance with the equation $SO_2+2C=S+2CO$ or $SO_2+2CO=S+2CO_2$, the SO₂-containing gases react either with the carbon of the fluidized bed or with the carbon monoxide which has left the fluidized bed or with fine carbon particles entrained by the gas stream. As a result, only the sulfur of the sulfur dioxide is reduced to elementary sulfur an can be separated from the gas phase by condensation.

The gases leaving the fluidized bed react with those from the melting burner to produce primarily sulfur vapor, carbon monoxide, hydrogen and nitrogen. The sensible heat of the exhaust gas can be used to preheat the sulfide concentrate. In that case the hot gaseous reaction products are preferably withdrawn above the fluidized bed of coal and are used to preheat the starting materials to be supplied to the melting burner.

In order to ensure an intense reaction, the process in accordance with the invention is preferably carried out in such a manner that the fluidized bed of coal is formed in a melting gasifier and is maintained by a supply of hot air and/or oxygen and of coal particles having a particle size of 1 to 50 mm, preferably 3 to 20 mm.

In order to ensure a quantitative reaction for the production of elementary sulfur in the gas phase, the temperature of the fluidized bed of carbon is preferably controlled by a control of the temperature of the hot air, and the rate of reducing gas is controlled by a control of the rate of hot air. The rate at which reducing gas is produced in the melting gasifier is preferably controlled in such a manner that a complete reaction of SO₂ to S is ensured and that the sulfur can be entirely separated from the gas phase by condensation.

The process in accordance with the invention distinguishes by the fact that important parameters can exactly be controlled and that the losses, e.g., of copper can be decreased greatly in comparison to known suspension melting processes. Particularly the maintenance of a temperature between 1200° and 1600° C., preferably of about 1400° C., in the fluidized bed of coal permits a recovery of, e.g., copper matte or a matte containing about 80% copper as a molten material which is free of iron sulfide, or even a recovery of blister copper, which is almost free of copper sulfide. Similarly, the process in accordance with the invention can also be used for a processing of other sulfide ores and of compley compounds thereof, such as nickel, lead, zinc and cobalt concentrates.

The apparatus which is proposed for carrying out the process in accordance with the invention comprises a melting burner and is essentially characterized in that the melting burner is connected directly to the top of a melting gasifier and that lines for an injection of hot air and for a supply of carbon particles to the melting gasifier and for a withdrawal of gaseous reaction products from said gasifier are connected to the gasifier. Said gaseous reaction products may desirably be used to preheat the starting material which is to be oxidized. For this purpose a gastight vessel is preferably provided, which is disposed over the melting burner and consists of a centrifugal dust collector. The hot gaseous reaction products are tangentially introduced into the vessel and constitute a swirling gas stream. The ore particles are supplied to that gas stream and are heated in contact with the hot gas. They are thrown by centrifugal force against the wall of the vessel and are collected at the bottom of the cyclone and are withdrawn from there by a metering device in the underlying melting burner. After the preheating, the gaseous reaction products can be withdrawn from the vessel in a simple manner by an immersed pipe and are then supplied to a dry-process gas purifier. Preheating is effected in any case only to such temperatures that the gases from the reaction will not be cooled to a temperature at which sulfur condenses. When the gas has been purified, the sulfur content is removed from the exhaust gas by a condensation in that the exhaust gas is cooled.

The molten products consisting of metal, matte and slag may be withdrawn from the smelting unit continuously or by intermittent tapping operations.

The smelting process in accordance with the invention may be used for a simple direct recovery of ferroalloys having a low carbon content in an operation in which only iron ores are additionally supplied. Ferrochromium can be made in that manner from a chromium ore composed of 46.40% $Cr_2O_3$
20.52% FeO
0.26% $Fe_2O_3$
0.30% CaO
9.58% MgO
14.58% $Al_2O_3$
4.10% $SiO_2$
0.002% $SO_3$
0.023% $P_2O_5$ balance oxide impurities and alkalines;
and ferromagnagese may be produced from Indian magnagese ore composed of 78 to 85% $MnO_2$
2 to 4% Fe
up to 6% $Mn_3O_4$
1 to 4% $SiO_2$
1 to 5% $Al_2O_3$
up to 0.2% P The process in accordance with the invention will now be explained more in detail with reference to illustrative embodiments of apparatus which are shown in the drawing and are particularly suitable for carrying out the process, and with reference to an example and to the heat balance.

DETAILED DESCRIPTION OF THE PREFERRED EMBODIMENTS

Figure 1:
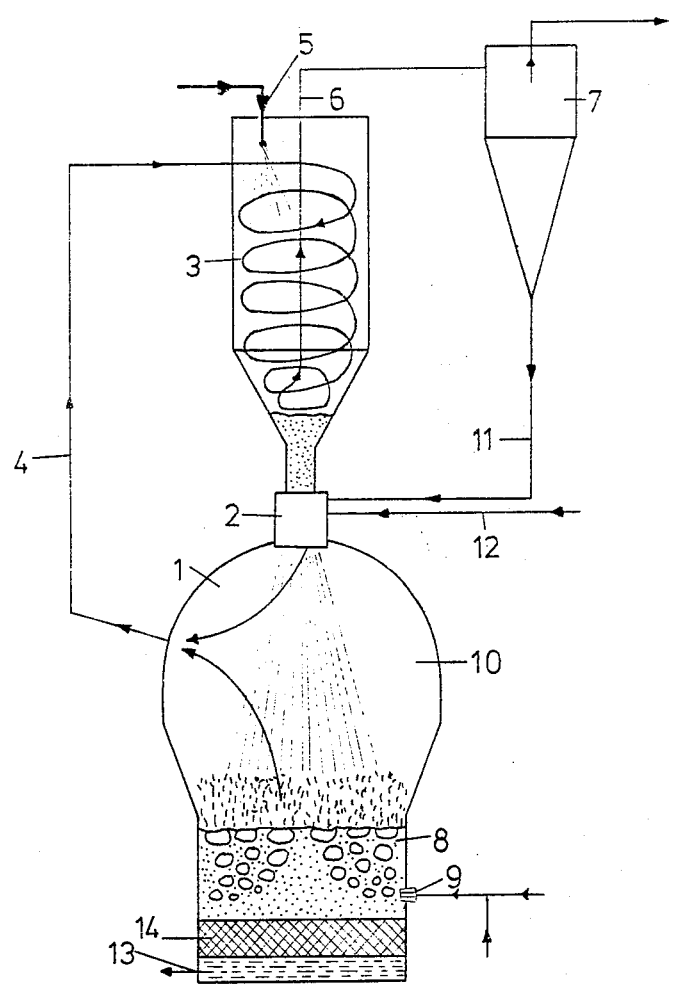
FIG. 1 is a diagrammatic view showing the combination of a melting burner process and a melting gasifier.

In accordance with FIG. 1, a melting burner 2 is provided at the top of a melting gasifier 1 and extends in the vertical axis of the furnace. The concentrate is supplied via a feeder 5 from an enclosed feeding bin 3, in which it is preheated by the hot exhaust gases supplied through line 4 from the reactor. The hot gaseous reaction products formed in the melting gasifier 1 are tangentially supplied into the feeding bin 3 and when they have flown through the feeding bin and have heated the material to be burnt are withdrawn through an immersed pipe 6 and supplied to a hot-gas cyclone 7. In the igniting space of the melting burner 2, the preheated starting materials are suspended in tangentially inflowing oxygen or a tangentially inflowing mixture of oxygen and hot air and are ignited there. At the high temperatures produced by the combustion, the concentrate soon forms small molten droplets, which together with the $SO_2$ flame impinge on the upper surface of a fluidized bed of carbon. In that operation the coal is separately charged, preferably in a continuous operation.

The temperature of the fluidized bed of coal 8 can be controlled by the heat content of the hot air or of the mixture of hot air and oxygen which is injected through the toyeres 9. The fluidized bed of coal serves to reduce $Cu_2O$ and $Fe_3O_4$ to Cu and FeO, to degasify the coal, to adjust the temperature of the molten products to the desired final value, to reduce part of the $SO_2$ to sulfur and to heat to about 1400° C. the nitrogen- and CO-containing gas which leaves the fluidized bed. With the exception of the reduction of $SO_2$, all said physical and chemical processes have a relatively small heat requirement so that the fuel consumption required for them is not very high. A major part of the coal is used to reduce $SO_2$. The gas bubbles emerging from the fluidized bed burst like fountains above the fluidized bed in a stilling space 10, in which the suspension coming from the melting burner and consisting of $SO_2$ and molten products is braked, heated and reduced by the counterflowing CO or nitrogen gas. This results in an optimum mixing of the gases and solid pulverized coal whereas the molten droplets are only slightly braked and dive into the fluidized bed. In the stilling space 10 and in the exhaust gas lines a major part of the $SO_2$ which becomes available is to be reduced by the CO and by the carbon content of the coke dust which is entrained from the fluidized bed. The gas temperatures lie at about 1300° C., on an average, and are sufficient for that purpose. The reducing power of the gas can be controlled by a control of the rate at which fine coke is burnt in the fluidized bed. A reaction of $SO_2$ with the carbon in the exhaust gas lines results in a substantial decrease of the carbon losses in the entrained dust and results in a decrease of the gas temperature because the reaction is endothermic.

The sensible heat content of the gas produced by said reactions is used to preheat the concentrate.

In the gas-purifying stage comprising a hot gas cyclone the entrained solids are collected and may then be supplied as dust in a line 11 to the melting burner. The line for supplying hot air and oxygen to the melting burner is designated 12.

Blister copper or matte and the slag 14 can be tapped from the lower part of the melting gasifier through a tap opening 13.

In this process the composition of the gas is continually changed as a result of changes of the reaction conditions, particularly owing to the reaction of $SO_2$ with C to form CO and $S_2$ in the fluidized bed. The gas atmosphere formed in the space above the fluidized bed consists mainly of sulfur, carbon monoxide, hydrogen, suspended carbon dust, $SO_2$ and nitrogen. The complete reaction of the residual sulfur dioxide with carbon monoxide, hydrogen and carbon in the exhaust gas lines results in the formation of a gas which contains sulfur, carbon monoxide, hydrogen and nitrogen. The more strongly the gas is cooled, the more likely will be the formation of $H_2S$, COS and $CS_2$. A production of elementary sulfur from said compounds is known in the art. When the sulfur has been separated, the exhaust gas contains mainly CO, $H_2$ and $N_2$ as well as small amounts of $CO_2$ so that that exhaust gas has a high calorific value and may be used, e.g., for preheating the air or as a high-grade energy transfer medium.

A special advantage afforded by the combination of the suspension smelting process, which is known in the art also as flash smelting, and of the smelting in a fluidized bed of coal resides in that an oxidizing process and a reducing process are combined in a single unit and a high-energy gas is produced at the same time. In the production of copper, a special advantage is due to the fact that the entire product spectrum from matte to blister copper can be produced without a risk of a high loss of copper in the slag. The supply of energy can be controlled by means of the melting burner and by the air tuyeres disposed below the fluidized bed of coal so that the quality of the concentrate has only a small influence on the process. Parameters which can be used as controlled variables are the oxygen supply rate, the hot air temperature and rate, the height of the fluidized bed, the purity of the matte, and the fuel consumption. The quality of the raw materials consisting of the concentrates and coals need not meet particularly high standards. Undesired accompanying elements, such as lead, zinc, antimony or the like, can be vaporized at the high reaction temperatures and may be separated from the gas phase.

The production costs are greatly reduced by the fact that elementary copper, high-grade matte or blister copper, and a high-energy gas are produced at the same time without the aid of low-grade hard coal.

Figure 2:
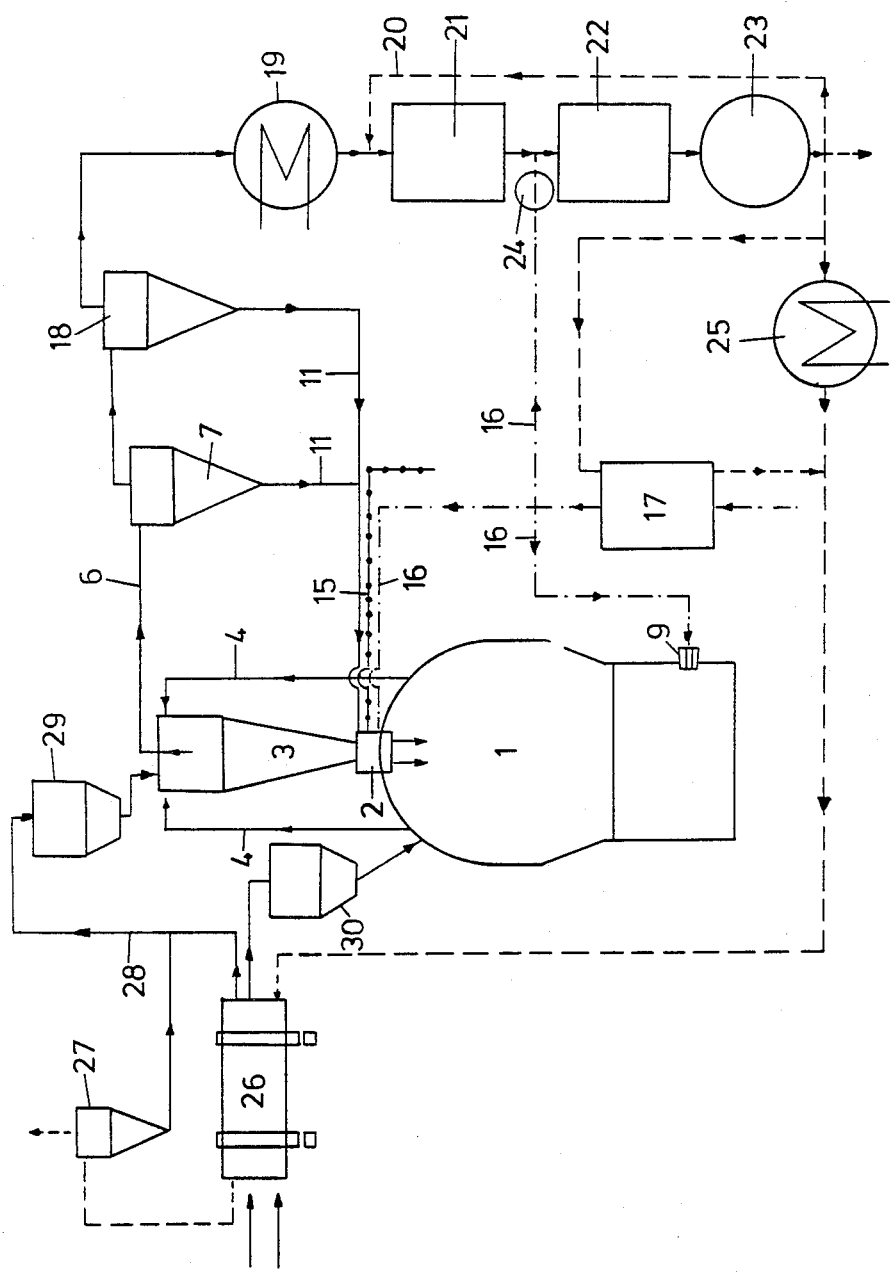
FIG. 2 shows an extended plant for a recovery of elementary sulfur.

FIG. 2 shows more in detail the additional equipment required for the recovery of elementary sulfur. The melting burner is again designated 1. A melting burner 2 is coaxial to the melting burner 1. The feeding bin is again designated 3. In this case, oxygen and air are supplied to the melting burner 2 in separate lines 15 and 16. In a preheating stage 17, the air is preheated by the energy of the exhaust gas. The gas withdrawn from the preheating bin 3 flows in line 6 to a first high-temperature cyclone 7, in which solids are collected. The collected solids are recycled in line 11 to the melting burner 2. A second high-temperature cyclone 18 is provided. The gas leaving that second high-temperature cyclone is conducted through a heat exchanger 19 for a recovery of waste heat from the process. Cooling gas is supplied in a line 20 and sulfur is condensed in a condensing unit 21. The condensation chamber 21 is succeeded by a Claus process plant 22, which is succeeded by a gas scrubber 23. In the Claus process plant 22, hydrogen sulfide is oxidized to form sulfur. For this purpose, the Claus process plant 22 is preceded by a combustion chamber 24. The reaction in the Claus process furnace can be represented as follows: $SO_2 + 2H_2S \rightarrow 3S + 2H_2O$. Hot air is preheated in a preheater 17 and is supplied in lines 16 to the combustion chamber 24 and to the tuyeres 9 of the melting gasifier 1. Another heat exchanger or waste-heat boiler 25 is incorporated in the flow path for the exhaust gas. The remaining exhaust gas can be used to dry the raw material in a solids-drying stage 26. The gas leaving that drying stage 26 is once more passed through a dust collector 27, and the collected solids are supplied in line 28 to the concentrate bin 29. In this case the coal is charged separately, preferably in a continuous manner, from a coal bin 30.

The invention will be explained in more detail hereinafter with reference to an example. A copper concentrate was used, which consisted of 90% copper pyrites ($CuFeS_2$) and 10% gangue ($SO_2$). The concentrate was dried and was preheated to 600° C. The end product consisted of a high-grade matte containing 80% copper and 20% sulfur. A slag containing 40% FeO was produced too. The feed coal had the following composition:

| | |
|---|---|
| $H_2O$ | 3% |
| Ash | 12% |
| Volatiles | 25% |
| Fixed carbon | 60% |
| O | 8.5% |
| H | 3.7% |
| N | 1.4% |
| S | 1.2% |
| Total carbon | 85.2% |
| Net calorific value | 6000 kcal = 25,100 kJ |

20% of the coal were lost as dust.

The entire ungasified carbon was reacted with $SO_2$.

The liquid products were at a temperature of about 1200° C. and the average temperature of the fluidized bed and of the gases leaving the fluidized bed amounted to about 1400° C. The gas leaving the melting gasifier was at a temperature of 1300° C. The combustion-supporting agent in the melting burner consisted of pure oxygen. The coke in the fluidized bed was gasified with hot air at 500° C.

The coal was fed in a particle size between 3 mm and 25 mm. The proporiton of the finest particles was varied to ensure a complete reaction of the $SO_2$. The subsequently reported energy balance is idealized in that a final gas composition consisting of CO, $H_2$, $N_2$ and $S_2$ was assumed. The heat balance was calculated for the various stages and was specifically calculated for the smelting in the melting burner and for the partial reduction of $SO_2$ at the surface of the fluidized bed, as well as for the fluidized bed. The gas balance for the stilling space, the gas balance after the reaction of the pulverized coal, and the heat balance for the region including the stilling space and the concentrate preheater were also established. This examination resulted in the following values:

Smelting in the burner and partial reduction of $SO_2$ in the fluidized bed:
1000 kg concentrate consist of 900 kg copper pyrites and 100 kg gangue.
900 kg copper pyrites are converted to 387 kg high-grade matte ($CU_2$), 432 kg FeS and 81 kg S.
222 $sm^3$ $O_2$ are required for the oxidation of FeS and $S_2$ to 352 kg FeO and 167 $sm^3$ $SO_2$. The addition of 428 kg fluxes resulted in a formation of slag in a total amount of 880 kg.

The residual $SO_2$ is most likely to react with the hydrogen to form S and $H_2O$ ($SO_2 + 2H_2 = 1S + 2H_2O$).

The tail gas had the following composition:

| | $S_2$ | CO | $H_2$ | $N_2$ | $H_2O$ |
|---|---|---|---|---|---|
| $sm^3$ | 83.3 | 478.8 | 62.6 | 33.6 | 83.8 |

After the condensation of the sulfur and water vapor, the final composition was

| | CO | $H_2$ | $N_2$ | Σ |
|---|---|---|---|---|
| $sm^3$ | 478.8 | 62.6 | 336 | 877.4 |
| % | 54.6 | 7.2 | 38.3 | |

The gas had a calorific value of 1870 kcal/$sm^3$ (=7835 kJ). The entire tail gas had a heat content of 1,600,000 kcals (=6.700,000 kJ).

In the case described, the following quantities were required per 1000 kg concentrate:

317 kg coal (net calorific value = 6000 kcal
= 25,100 kJ)

430 kg fluxes
222 $sm^3$ $O_2$
426 $sm^3$ hot air.

The overall energy balance is as follows:

| | kcal | kJ |
|---|---|---|
| Heat inputs: | | |
| Air preheating | 64,800 | 271,500 |
| 317 kg coal having a net calorific value of 6000 kcal = 25,100 kJ per kg | 1,902,000 | 7,969,400 |
| 1000 kg concentrate | 1,003,200 | 4,203,400 |
| Total | 2,970,000 | 12,444,300 |
| Heat outputs: | | |
| Sensible heat content of matte | 67,800 | 284,100 |
| Sensible heat content of slag | 288,600 | 1,269,200 |
| Sensible heat content of gas | 215,800 | 904,200 |
| Chemical heat content of gas | 1,600,000 | 6,704,000 |
| Chemical heat content of elementary sulfur | 524,000 | 2,197,700 |
| Losses | 273,300 | 1,145,100 |
| Total | 2,970,000 | 12,444,300 |

As there is an energy input consisting of 7.96 GJ of fossil energy and a heat output of 1.6 Gcal=6.7 GJ in the form of high-grade gas heat, the net expenditure of energy per metric ton of concentrate amounts only to about 300,000 kcal (=1,257,000 kJ).

This means that about 1 Gcal (=4.2 GJ) of fuel are required per metric ton of copper metal. Additional 400,000 kcal (=1.676,000 kJ) are required for the production of oxygen so that a total energy of 5 to 6 GJ is required per metric ton of tubular copper.

Figure 3:
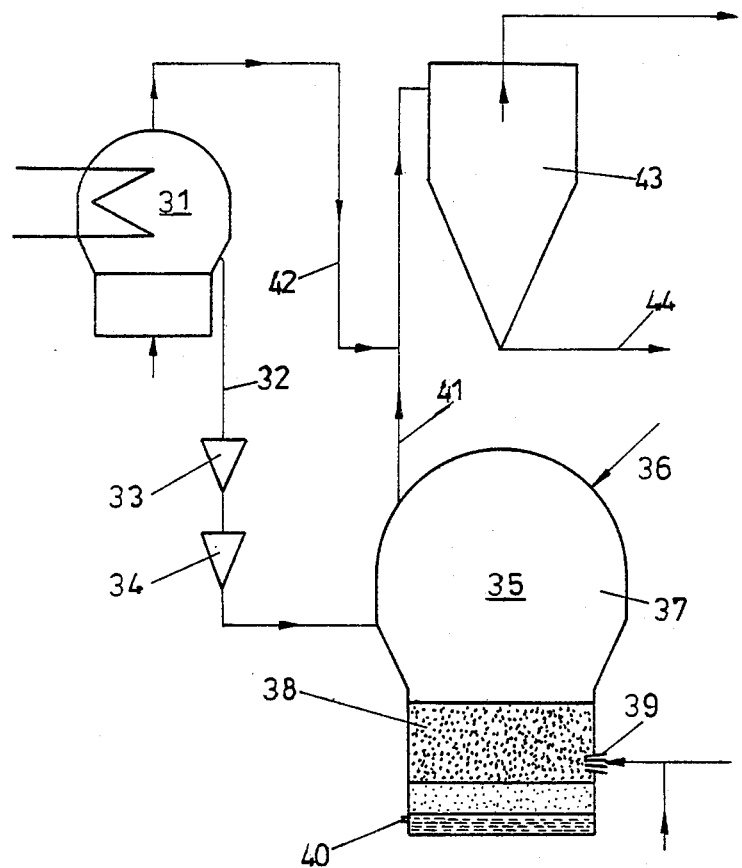
FIG. 3 shows a plant which is particularly suitable for the processing of oxide ores.

FIG. 3 shows a fluidized-bed roasting furnace 31, which is supplied with ore and fluxes, e.g., in a granular form. If the ores consist only of oxides, which will rarely be the case, it will be sufficient to preheat in that unit the materials to be charged. In the processing of sulfide ores, an oxidation is effected with formation of $SO_2$-containing gases, which are withdrawn from the fluidized-bed roasting furnace or together with the roasted concenrate can be supplied through a line 32 and suitable feeders 33 and 34 to a melting gasifier 35. The gasifier head of the melting gasifier 35 is designated 37. Coal is supplied in a line 36 to the melting gasifier 35. Relatively inexpensive coal may be used for that purpose. A stable fluidized bed 38 of coal is formed in the lower portion of the melting gasifier. For this purpose, hot air and/or oxygen are injected through tuyeres 39 into the melting gasifier. The melting gasifier is provided close to its bottom with a tap opening 40, through which metal and slag can be tapped. The reducing reactor gases are withdrawn from the melting gasifier in an exhaust gas line 41, which may be supplied via line 42 with sulfur dioxide-containing gases withdrawn from the fluidized-bed roasting furnace. The exhaust gases from the melting gasifier are still at a sufficiently high temperature and owing to the entrained fine-grained material or dust from the fluidized bed of coal contain carbon at a sufficiently high rate for a reaction of $SO_2$ to elementary sulfur. The exhaust gas from the reactor is supplied to a high-temperature cyclone 43, in which solids are collected from the gas. The dust is withdrawn in a line 44 and may be supplied to the melting gasifier 35 together with the coal or may be admixed to the calcine. The purified exhaust gas contains, as a rule, carbon, sulfur, carbon monoxide, carbon dioxide, nitrogen, COS, $CS_2$, $H_2S$ and small quantities of $SO_2$. Sulfur can be recovered from said gases by condensation and by processing in a Claus process plant.

What is claimed is:

1. A smelting process of recovering metal from ore containing heavy metal non-ferrous metal sulfides, comprising: reacting the ore in particle form with an oxygen-containnng gas in a first reaction vessel in a manner to produce heat and to oxidize the ore to form sulfur dioxide and molten droplets containing metal sulfides and metal oxides; passing the molten droplets and sulfur dioxide downwardly into a second reaction vessel having an upper end and containing a fluidized bed of coal particles, having an upper surface, in a manner to impinge the molten droplets directly onto said upper surface; supplying coal particles and an oxygen-containing gas to the second reaction vessel under conditions to fluidize the coal particles and to react the particles and the gas to produce reducing gases and smelting heat, the molten droplets passing downwardly through the fluidized bed and thereby being reduced so as to form molten metal products, withdrawing reducing gases from near the upper end of the second reaction vessel and withdrawing molten metal from the second reaction vessel at a location below the fluidized bed.

2. A smelting process of recovering metal from fine-grained non-ferrous metal sulfide ores or concentrates, wherein sulfide ores are oxidized with a supply of air and/or oxygen, comprising: supplying the ores or concentrates in lump form and/or granular form to a melting burner oxidizing the ores or concentrates in with an oxygen-containing gas in a manner to produce a flame jet containing droplets of molten sulfides; directing the flame jet and molten sulfides to a fluidized bed of coal in a melting gasifier; introducing air and/or oxygen from below the fluidized bed to maintain said fluidized bed and to oxidize the coal to produce smelting heat and gaseous reaction products containing reducing gases which along with the coal react with the ore or concentrates to form molten metal products; and withdrawing the molten metal products below the fluidized bed of coal.

3. A process as in claim 2 wherein the particle size of the ores or concentrates to be supplied in between 1 mm and 50 mm.

4. A process as in claim 2 wherein the particle size of carbonaceous particles in the fluidized bed is between 1 mm and 50 mm.

5. A process as in claim 2 including maintaining the fluidized bed of coal at temperatures between 1200° and 1800° C.

6. A process as in claim 2 including controlling the temperature of the fluidized bed of coal by an injection of hot air and/or oxygen into the bed.

7. A process as in claim 2 including passing the gaseous reaction products formed in the melting gasifier to a high-temperature cyclone for solids removal.

8. A process as in claim 2 including adding gases from roasting to the gaseous reaction products formed in the melting gasifier, said addition being effected in the fluidized bed of coal.

9. A process as in claim 2 including withdrawing hot gaseous reaction products formed in the melting gasifier above the fluidized bed and preheating the starting materials to be supplied to the melting burner with said withdrawn gases.

10. A process as in claim 2 including controlling the temperature of the fluidized bed of coal by controlling the temperature of the supply air and controlling the rate of reducing gas by controlling the hot air rate, air-oxygen rate and coal supply rate.

11. A process as in claim 2 including maintaining a temperature between 1280° and 1600° C. in the fluidized bed of coal.

12. A process as in claim 2 including so controlling the rate and temperature of the reducing gas formed in the melting gasifier that a complete reduction of $SO_2$ formed in the melting burner to sulfur is ensured and separating the sulfur from the gas phase.

13. A process as in claim 2 including injecting carbonaceous material together with the oxygen-containing gases into the melting burner.

* * * * *